Figure 1:
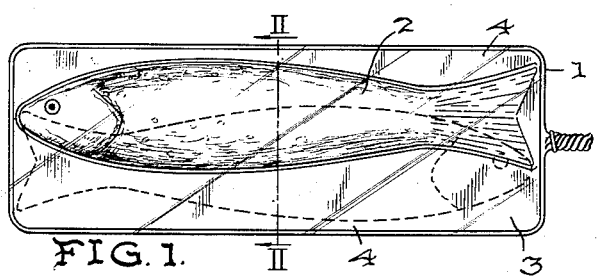

Jan. 1, 1957 C. J. S. THOMAS 2,776,215
MEAT PRODUCT AND PROCESS
Filed May 29, 1951 2 Sheets-Sheet 1

INVENTOR.
COLIN J. S. THOMAS
BY
Walter C. Wheeler
ATTORNEY

INVENTOR.
COLIN J. S. THOMAS
BY
Walter C. Wheeler
ATTORNEY

United States Patent Office

2,776,215
Patented Jan. 1, 1957

2,776,215

MEAT PRODUCT AND PROCESS

Colin J. S. Thomas, Ruxton, Md.

Application May 29, 1951, Serial No. 228,879

11 Claims. (Cl. 99—174)

This invention relates to the packaging or wrapping of somewhat deformable or flaccid meat products such as a sliced chop or a fish, and especially to novel means for preserving a predetermined contour of a part or all of such a product and the quality thereof, and to eliminate or diminish to a minimum air spaces in and around the product within the wrapping.

Heretofore meat products such as hams and bacon have been enclosed in wrappings of textile woven material which are drawn tightly around the articles and stitched. This kind of a wrapping is solely for protection. It does not permit of visual inspection of the wrapped material without destroying the covering. It does not tend to preserve any given shape to the wrapped article apart from that provided by the bone structure, and it provides little or no protection from oxygen of the atmosphere or from loss of contained water. Dressed fowl has been wrapped for freezing in a transparent or translucent sheet material which is drawn or shrunk tightly about the fowl. This kind of a wrapping is a desirable enclosure for materials of irregular and massive contour, apart from that provided by the skeleton, the shapes of which are not material as a matter of sales display. The wrapping provides no support for fragile parts of such a product and the wrapping is not entirely satisfactory where the material is frozen for the reason that the skeleton does not permit of closing the quite large cavities of a wrapped fowl. Considerable water is always present which collects in the cavities upon the inside of the wrapping when the fowl is frozen. This kind of a wrapping modified by completely filling the cavity of the fowl with frozen water adds little, if any, improvement over a cavity which is only partially filled with frozen water. The presence of added water practically prevents accurate weighting of the packaged fowl. None of these wrappings, however, is satisfactory for wrapping a relatively easily deformable meat product which has a predetermined characteristic shape such as a fish, wherein it is material to preserve intact or give shape to an easily deformable feature, or flaccid part of the product, such as a fin or tail structure, and where the wrapped material does not have a non-deformable skeleton structure which prevents distortion when the wrapping material is tightly stretched or shrunk around the material. The wrappings heretofore used do not materially exclude atmospheric air from cavities within the wrapping nor provide entirely adequate support for easily damaged parts of frozen meat products.

It is among the objects of this invention to provide a wrapping in advantageous form suitable for nesting or packing the wrapped material in a refrigerated space so that shipping packages may be made compact. Another object is to provide an improved manner of wrapping and arranging a plurality of portions of a meat product in one package so that deformable parts of the wrapped material will be supported and damage thereto will be avoided. Another object of the invention is to provide a wrapping which entirely eliminates or diminishes internal cavities of the wrapped material so that little or no atmospheric air will remain in the package, thus materially improving the preservative qualities of the wrapping, particularly when the wrapped material is frozen. A further object is to provide a wrapping which excludes all material amounts of atmospheric air from between the wrapped material and the wrapping. Another object is to provide a planar or flat base upon which the wrapped material is supported and about which the outer wrapping is shrunk, and to exclude air from the enclosure. Still other objects of the invention will be apparent from the following more detailed description thereof.

I have found a combination of materials and a method of mounting and wrapping such articles which provides products in excellent form for packing in refrigerated spaces and further provides a protective covering closely conforming to a desired shape of a distortable part of the wrapped material. The wrapping is sufficiently transparent to faithfully display the exterior color and easily distortable physical features of the wrapped material. Relatively fragile or easily distortable parts are reinforced and protected. The finished package may be caused to be shaped so as to faithfully display desired characteristic lines of the article and to provide an article of distinctive appearance. For example, a fish or a plurality of fish are wrapped in accordance with the present invention so that the finished package may simulate the characteristic appearance of a fish and the easily distortable parts of individual fish such as the tail fin are faithfully preserved while still providing a protective wrapping stretched over and around the distortable part and excluding air pockets from within the wrapping.

The packaging means comprises a shaped relatively stiff base material which is enclosed within the outside wrapping and this wrapping conforms to the base element as well as to all the exposed surface of the wrapped material so that air bubbles are excluded and frost forming receptacles are excluded from the outer surface of the meat and base material. This is a considerable advantage since the deteriorating effect of the air is excluded from this part of the package, and in certain modifications the exposed surface of the base element not in contact with the wrapped material is rendered visible, so that printing or identification marks may be readily seen through a light-transmitting wrapping. The meat material is firmly consolidated with the base element, and where the package includes more than one parcel of meat, each parcel tends to reinforce the other from distortion, especially when the package is frozen.

The invention will be more fully described with reference to the accompanying drawings which show illustrative embodiments of the invention, in which:

Fig. 1 is a top plan view of a wrapped article containing two fish, one of which is disposed on one side of a stiff flat base element and the other is disposed on the other side of the base element.

Figure 2:
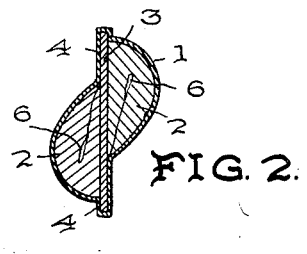
Figure 3:
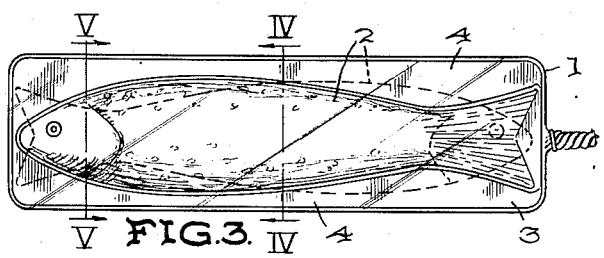
Figure 4:
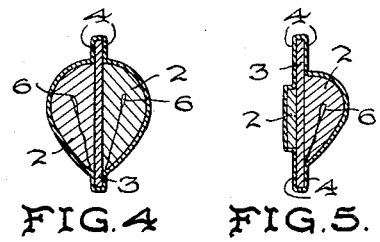
Figure 5:
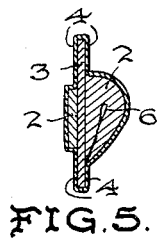
Figure 6:
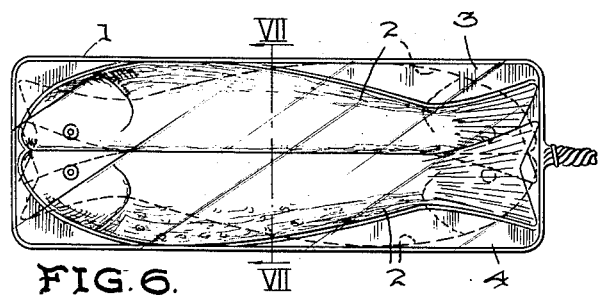
Figure 7:
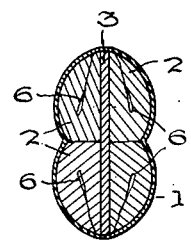
Figure 8:
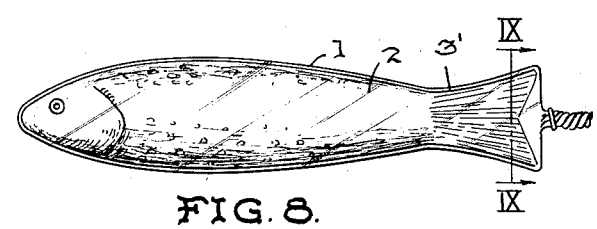
Figure 9:
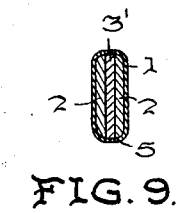
Figure 10:
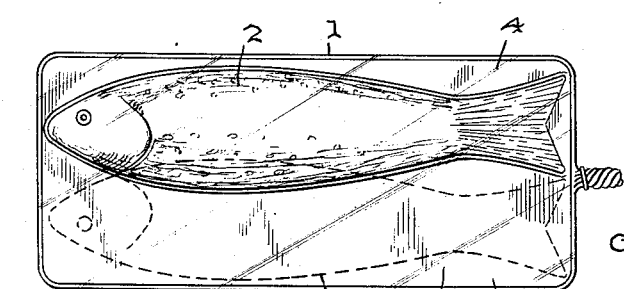
Figure 11:
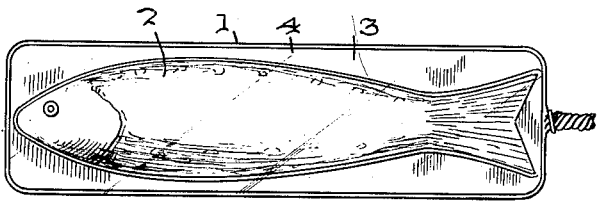
Figure 12:
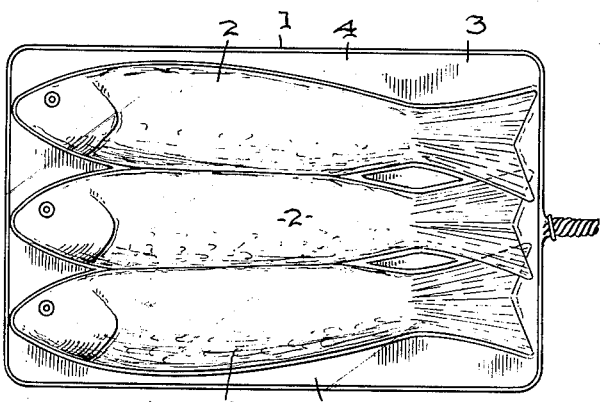
Figure 13:
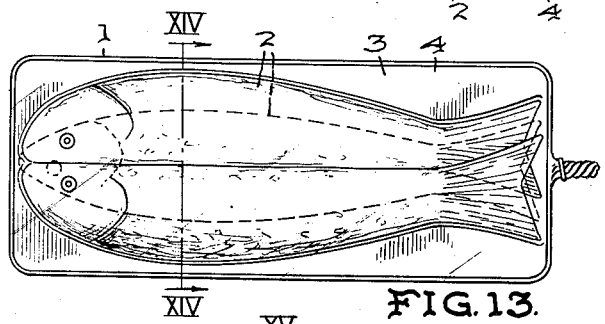
Figure 14:
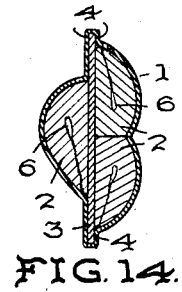
Figure 15:
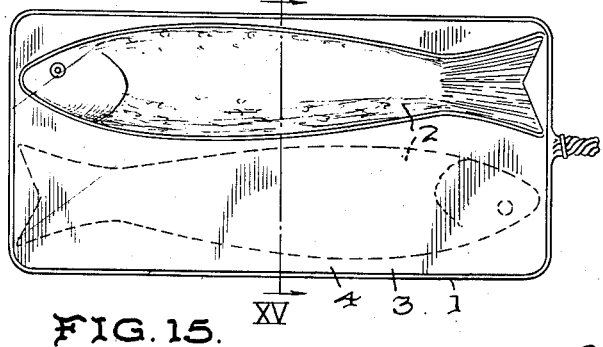
Figure 16:

Fig. 2 is a cross sectional view of the article shown in Fig. 1, taken along the line II—II of Fig. 1, Fig. 3 is a top plan view of another wrapped article containing two fish which are disposed on opposite sides of a stiff flat base element with the head of one disposed opposite the tail fin of the other, Fig. 4 is a cross-sectional view of the article shown in Fig. 3 taken along the line IV—IV of Fig. 3, Fig. 5 is a cross-sectional view of the article shown in Fig. 3 taken along the line V—V of Fig. 3, Fig. 6 is a top plan view of still another wrapped article which contains four fish, two of which are mounted on each side of a stiff flat base element, Fig. 7 is a cross-sectional view of the article shown in Fig. 6 taken along the line VII—VII of Fig. 6, Fig. 8 is a top plan view of a wrapped article which contains two fish, mounted oppositely on the base element with their tail fins opposite each other, Fig. 9 is a cross-sectional view of the article shown in Fig. 8, taken along the line IX—IX of Fig. 8, Fig. 10 is a top plan view of a wrapped article containing two fish in which the fish are mounted on opposite sides of a relatively undistorted base element and the fish overlap each other intermediate their heads and tails, Fig. 11 is a top plan view of a package containing one fish mounted integrally on a rectangular base element, Fig. 12 is a top plan view of a package containing a plurality of fish mounted integrally upon a rectangular base member and mutually supporting each other from distortion, Fig. 13 is a top plan view of a package containing three fish, one of which is mounted on the opposite side of the base member from the other two, Fig. 14 is a cross-sectional view of the article shown in Fig. 13 taken along the line XIV—XIV of Fig. 13, Fig. 15 is a top plan view of a package containing two fish which are mounted on opposite sides of a base member with which they are integrally combined, and Fig. 16 is a cross-sectional view of the article shown in Fig. 15 taken along the line XV—XV of Fig. 15.

In general, the various parts of the wrapping comprise an enclosing sheet-like covering, preferably of a transparent or translucent filamentous material. The material is of a kind which is imperforate to air and vapor, pliable, relatively strong, and which upon being heated or immersed in hot water will shrink, and when heated to such temperature and tightly shrunk around a wrapped object will remain sufficiently strong not to rupture. Vinyl vinylidine chloride copolymer in sheet form is a suitable material for this purpose, but any pliable sheet-form air imperforate material which has the requisite property of shrinking after it is applied as a covering can be used. The base element is a flat thin relatively difficultly deformable material, such as a relatively stiff paper, cardboard, wood veneer or a plastic sheet, but other materals having the indicated properties can be used. When the base element is a porous product a coating of a water-impervious or repellant material, such as paraffin on at least one side of the base element is desirable as an aid in retaining moisture in the meat. The meat may desirably be mounted in contact with a moisture-proofed surface.

Referring to Figs. 1 and 2, a relatively easily deformable material 2 to be wrapped, such as a slice of beef steak or an eviscerated fish is laid on its side on a relatively stiff, flat, thin, relatively difficultly deformable, sheet-like base element 3 which may be a cardboard about one thirty-second of an inch thick. The cardboard may be rectangular in shape as shown in Figs. 1, 3, 11 and 12 or trimmed to a fish-like contour as shown in Fig. 8, being about the length of the fish to be wrapped. A rectangular base element may be somewhat wider than the cross section of a single fish to be wrapped so that a second fish or two other fish as shown in Figs. 3, 6 and 10 can be assembled on the opposite sides of the base element. In the form of assembly shown in Fig. 1, the base element 3 is made generally rectangular with rounded corners so that the wrapping material next to be applied will not be easily ruptured. The base element may also be made wide enough so that there will be a narrow margin 4 of base element on either side to protect the frozen meat from edgewise contacts in handling or shipment. This margin however may be eliminated where such protection is not essential and where it is desired to distort the meat material considerably to the edge of the base element as indicated in Fig. 8.

In the latter modification, the base element is made about the same length as the fish to be wrapped but the width is narrowed to a size which requires that the distortable meat material be distorted, compressed and extended to the very edge of the base material when the wrapping material is shrunk. This provides assurance that the external surface of the meat material along the edge of the base element be coterminous with the edge of the base element and present substantially no opportunity to form an air space within such part of the wrapping. In the package containing four fish shown in Fig. 6, the tail fins of the fish are spread out and one is laid out so that it overlaps the other while the base element may be rectangular or formed at the end in the general shape of a tail fin as shown in Fig. 8, and broad enough to prevent distortion of the tail fin when the wrapping is shrunk.

In Fig. 8, two fish are mounted opposite each other on a cardboard base element 3' which is trimmed to a size somewhat smaller than the maximum longitudinal cross-sectional width of the fish intermediate the head and tail, about the width of the heads and tails, and about the length of the fish. This allows for some distortion of meaty portions when the wrapping is closed, the air is exhausted and the wrapping is shrunk. In this form of wrapping the tail fins lay opposite each other with the flat base element therebetween, thereby providing a three-ply structure of considerable resistance to breakage and distortion when the article is frozen. In other forms of wrapping the head of one fish and the base element support the tail fin on the opposite side of the base element, while in the form shown in Fig. 10 the base member and the fish form a mutual support by reason of the fact that the wrapping is exhausted and stretched entirely around and in contact with the exposed surfaces of the fish and all the exposed surfaces of the base element. The fish are preferably disposed and integrally united with the base element and wrapping in the wrapping shown in Figs. 6, 9, 10 and 13 so that more or less of the bodies are opposite each other, but they may be mounted so that they do not overlap as illustrated in Fig. 15. In this modification it is evident that the base member can be cut through between the fish so that the fish on one side of the base member can be used whilst leaving the other fish mounted and sealed in the wrapper. In the latter modification, considerable mutual support and protection is afforded, and it is evident that considerable more protection is provided in this assemblage than is provided when a single fish is wrapped upon a base member within a wrapping which is neither evacuated nor shrunk. In the improved wrapping, the sheet form wrapping material contacts all the exposed surfaces of the base element and meat product. This is characteristic of all the modifications of the present invention.

As further illustration of the manner of practicing my invention, a thin sheet of suitable size of vinyl vinylidine chloride copolymer which shrinks about 70% of its original size when heated to about 90° C is provided. A sheet material which is transparent or translucent is preferable. It is economical to form the sheet material into the form of a bag. The bag or other wrapping is made of suitable size such that the maximum shrinkage will result in compressing the wrapped meat onto the base element, and distorting the meat somewhat so that it will be integrally combined and conform somewhat to the contacting surface of the base element. This integral combining of the meat material and base element may be accompanied by a slight distortion of the base element where the stiff base element is slightly flexible.

When the sheet form material is in the form of a bag the fish 2 and base element 3 arranged as shown in the drawings may be held upright in a bag of the above named sheet material and the mouth of the bag is held tightly over the end of an exhaust hose leading to an evacuated tank. The air in the bag is then exhausted sufficiently to partially or wholly collapse any cavities within the eviscerated fish and to cause the bag to collapse and conform to any surface cavities or external undulations of the article and base member. In this form the plastic sheet is somewhat wrinkled and deformed in numerous different directions, but the fish and base member are integrally combined. The mouth of the bag or wrapping is then suitably sealed as by twisting together the projecting portions which may be tied with a string or stapled as indicated in the drawings.

The article thus wrapped is then heated in order to shrink the sheet material. The wrapping is heated to a temperature which causes the wrapping to shrink. It is convenient to immerse the entire wrapped article in hot water which is heated to a temperature sufficient to cause extensive shrinking of the plastic bag, say to about 70% of its original size. The temperature may be regulated according to the shrinking characteristics of the kind of material used for the wrapping. A temperature of about 90° C. is suitable for shrinking the above named copolymer, but higher or lower temperatures may be used. This shrinkage causes the wrapping material to be tightly and smoothly drawn around the exposed surfaces of wrapped material and base element and to compress the meaty material within the wrapping and against the base element. The bag or wrapping is made of suitable snugness to distort the meaty parts of the wrapped material when the wrapping is shrunk, and so that the edges 4 of the base element 3 will conform smoothly to the distorted confined margins 5 of the wrapped material when the width of the base material is narrow as shown in Fig. 8.

The exhaustion of the air and the shrinking of the sheet material 3, collapses the meaty article more or less according to the amount of exhaustion and the amount of shrinkage applied, and the meat and base element conform to each other. There will remain either no cavity or only a diminished cavity 6 within the packaged material. The exhaustion of air tends to collapse the cavity 6 within the material. The exhaustion, together with the shrinkage of the wrapping, completely closes the outer margins of the cavity. This results in a partial or a total collapsing of any cavity in the wrapped material so that all air is excluded from such internal cavities 6 or all but immaterial amounts are excluded. Spaces and air pockets are also eliminated from between the sheet material and depressions in the surface of the wrapped material. Further, the outer edges of the cavity are securely closed by the shrinkage of the wrapping so that upon freezing, any frost which may result from the freezing of moisture within the package is obscured within the closed cavity. At the same time, the shrinking of the wrapping material conforms exactly to the outer surfaces of the fish and base material so that all the cavities wherein frost or frozen water might accumulate are closed or obscured from view. It is evident that all cavities may be completely collapsed and eliminated by the exercise of care, but partial collapsing of such cavities is effective provided the margins of the cavities are drawn together. Finally the material and wrapping may be, and preferably are subjected to deep freezing.

In assembling a plurality of fish on opposite sides of the base member with parts of the fish overlapping, it is evident that the meat material is compressed and held firmly against the base element by the evacuation and shrinkage of the wrapping material and that easily distortable portions such as tail fins are reinforced against distortion both by the base member and by the fish on the same or opposite side of the base member. Where the fish do not overlap each other as illustrated in Fig. 14, the shrinkage of the wrapping material around the exposed surfaces of the fish and base material together with the compression and distortion of the meat so that contacting surfaces conform to each other, provide a composite reinforced structure. The compressing of the distortable material and the shrinkage of the outer sheet wrapping on all exposed surfaces of the base element and distorted wrapped material provides a composite article of considerable stability even before it is frozen. The freezing adds supports and stability.

While the mounting of more than one of an odd number of fish on one side of the base element is not illustrated in the drawings, it is evident that an even number of fish can be mounted on one side of the base element and an odd number can be mounted on the other side in the same manner than an even number are assembled on both sides of the base element. Some of the fish mounted in this manner may be opposed to each other in the various manners shown in the drawings, or they may be mounted so that one or more individually are not opposite one another on the reverse side of the base member.

From the foregoing disclosure it will be recognized that the invention is susceptible of modification without departing from the spirit and scope thereof, and it is to be understood that the description is not to be construed as limiting the invention to the specific illustrations thereof which are herein set forth.

I claim:

1. An article of wrapped eviscerated fish which comprises a relatively difficultly deformable and relatively thin flat base member at least as wide as the tail fins of the fish to be wrapped; fish of about the length of the base member disposed on opposite sides thereof, and a thin imperforate sheet form material which shrinks when heated, said sheet form material being under tension, enveloping and contacting the entire exposed surfaces and edges of said fish and base members; the walls of the cavities of said fish being collapsed for reducing the cavities thereof and the margins of said cavities being completely closed by said collapsed walls.

2. An article in accordance with claim 1 in which the tail fin of a fish on one side of the base member is protected from damage by disposing the head of another fish on the opposite side of said base member opposite said tail fin.

3. An article in accordance with claim 1 in which the tail fin of a fish on one side of the base member is flattened out on one end of said base member and is protected from damage by flattening out the tail fin of another fish on the other side of said base member opposite said first named tail fin.

4. The method of wrapping articles of relatively flaccid meat which comprises assembling at least one of said articles on one side of a relatively thin, flat and relatively difficultly distortable base member which is about the length of said article; assembling at least one other such meat article on the opposite side of said base element; enclosing said articles thus assembled within an imperforate sheet-form covering which shrinks when heated; reducing the pressure of air within said enclosure; removing the air pockets between said covering and the said article and base member; closing said covering; and then heating said covering for shrinking the same while said air pockets are removed and until said sheet-form covering is under tension roundabout and in contact with the surfaces of said base element and wrapped articles.

5. The method in accordance with claim 4 in which the meat is a plurality of eviscerated fish; placing at least one of said fish on the opposite side of the base member from the others; disposing the terminal portions of said one fish opposite the others so that the tail fins will be supported by the base member and at least a portion of the terminal parts of the other fish; and finally freezing the article.

6. The method in accordance with claim 4 in which the meat is a plurality of eviscerated fish; placing a pair of fish in parallelism on opposite sides of the base member with the head of one opposite at least a portion of the tail fin of the other; the pressure of air within said sheet-form covering being reduced until the marginal walls of the cavities within the fish are collapsed and the cavities are reduced; and finally freezing said fish.

7. The method in accordance with claim 4 in which the meat is two eviscerated fish; disposing one fish on its side on one side of the base member with its tail fin spread out thereon; disposing the other fish on its side on the other side of the base member with a part of its head opposite a part of the tail fin of said first fish and a portion of its tail fin opposite a part of the head of said one fish; said base member being about the length of said fish; and finally freezing said fish.

8. The method in accordance with claim 4 in which the meat is two eviscerated fish; disposing one fish on its side on one side of the base member with its tail fin spread out thereon; disposing the other fish on its side on the other side of the base member with its head opposite the tail fin of said one fish and its tail fin opposite the head of said one fish; said base member being about the length of both fish; and finally freezing said fish.

9. The method in accordance with claim 4 in which the meat is two eviscerated fish; disposing one fish on its side on one side of the base member with its tail fin spread out thereon; disposing the other fish on its side on the other side of the base member with its head opposite the head and the tail opposite the tail of said one fish; said base member being about the length and wider than the largest longitudinal cross-section of at least one of said fish; said exhaustion of air and shrinkage of the covering being continued until at least the marginal portions of the cavities in said fish are wholly closed and the spaces are removed between the exposed surfaces of the fish and base member and the covering; and finally freezing the fish.

10. The method in accordance with claim 4 in which the meat is at least four eviscerated fish, the two fish on one side being mounted on their sides and back to back with both heads at one end of the base, the tail fin of one of said two fish spread out on the base with the tail fin of the other overlapping it; the other two fish being similarly disposed toward each other on the opposite side of the base member; one pair of fish being disposed with at least part of their terminal parts opposed to the terminal parts of the other pair, and forming with a contiguous portion of said base member a reinforcement for the tail fins.

11. The method in accordance with claim 4 in which the meat is a pair of eviscerated fish disposed opposite to each other on opposite sides of the base member with the base member, the head and the tail of each fish reinforcing the head and tail of the other fish; said base being shaped similar to but not larger than the longitudinal cross-section of the fish; said fish being distorted by the exhaustion of air and shrinkage of said covering until the base member in the intermediate areas between the heads and tails of the fish is wholly covered by said fish; and finally freezing said fish.

References Cited in the file of this patent

UNITED STATES PATENTS

| | | |
|---|---|---|
| 1,710,386 | Taylor | Apr. 23, 1929 |
| 1,933,516 | Rosen | Oct. 31, 1933 |
| 2,071,300 | Gammeter | Feb. 16, 1937 |
| 2,173,917 | Ryan | Sept. 26, 1939 |
| 2,315,999 | Holm | Apr. 6, 1943 |
| 2,376,583 | De Poix | May 22, 1945 |
| 2,476,102 | Lobell | July 12, 1949 |
| 2,536,639 | Guyer | Jan. 2, 1951 |
| 2,596,514 | Uehlein | May 13, 1952 |

OTHER REFERENCES

"Modern Packaging," September 1950, pages 93, 94, and 95.